United States Patent [19]

Hentschel et al.

[11] Patent Number: 5,502,148
[45] Date of Patent: Mar. 26, 1996

[54] TWO-COMPONENT POLYURETHANE COATING COMPOSITIONS AND THEIR USE FOR COATING OR SEALING FLOORS

[75] Inventors: Karl-Heinz Hentschel, Bergisch Gladbach; Ulrich Walter, Langenfeld; Bernd Riberi, Odenthal, all of Germany

[73] Assignee: Bayer Aktiengesellschaft, Leverkusen, Germany

[21] Appl. No.: 182,871

[22] Filed: Jan. 18, 1994

[30] Foreign Application Priority Data

Jan. 28, 1993 [DE] Germany .................. 43 02 266.9

[51] Int. Cl.$^6$ .................. C08G 18/42; C08G 18/48; C08G 18/73; C08G 18/74
[52] U.S. Cl. .................. 528/60; 528/59; 528/65; 528/66; 528/67; 528/73; 528/76; 528/77; 528/80; 528/81
[58] Field of Search .................. 528/59, 60, 65, 528/66, 67, 73, 76, 77, 80, 81

[56] References Cited

U.S. PATENT DOCUMENTS

| | | | |
|---|---|---|---|
| 3,357,939 | 12/1967 | Reischl et al. | 528/67 |
| 3,454,533 | 7/1969 | Kerrigan et al. | 528/67 |
| 3,494,888 | 2/1970 | McElroy | 528/67 |
| 3,580,881 | 5/1971 | Lee | 528/67 |
| 3,645,979 | 2/1972 | Liebsch et al. | 528/67 |
| 3,998,794 | 12/1976 | Müller et al. | 528/67 |
| 4,324,879 | 4/1982 | Bock et al. | 528/67 |
| 4,732,957 | 3/1988 | Schuster et al. | 528/67 |
| 4,772,639 | 9/1988 | Pilger et al. | 528/67 |
| 4,788,262 | 11/1988 | Markusch et al. | 528/67 |
| 4,801,663 | 1/1989 | Ueyanagi et al. | 528/73 |
| 4,801,675 | 1/1989 | Pedain et al. | 528/73 |
| 4,910,332 | 3/1990 | Kahl et al. | 560/351 |
| 4,935,486 | 6/1990 | Wellner | 528/67 |
| 4,994,541 | 2/1991 | Dell et al. | 528/67 |
| 5,043,092 | 8/1991 | Pedain et al. | 528/67 |
| 5,143,994 | 9/1992 | Laas et al. | 528/67 |
| 5,354,834 | 10/1994 | Yoshida et al. | 528/59 |
| 5,369,207 | 11/1994 | Wolff et al. | 528/49 |
| 5,410,011 | 4/1995 | Konishi et al. | 528/73 |

FOREIGN PATENT DOCUMENTS 0495307   7/1992   European Pat. Off. .......... 528/67

OTHER PUBLICATIONS cf. e.g. the Technical Memorandum of the Applicant "Desmodur E 21" of Dec. 1990.
K.-H. Hentschel and E. Jürgens at the XXI Fatipec–Congress (1992).
cf. e.g. Technical Memorandum of the Applicant "Desmodur L" 1.1.86 edition.
cf. e.g. the paper given by W. Kubitza at the International Symposium on Industrial Floorings from 15.1 to 17.1.91, Bulletin pp. 533–537.

Primary Examiner—James J. Seidleck
Assistant Examiner—Rabon Sergent
Attorney, Agent, or Firm—Joseph C. Gil; Thomas W. Roy

[57] ABSTRACT

Two-component polyurethane coating compositions essentially containing A) a polyisocyanate component containing A1) certain aliphatic polyisocyanates and A2) certain aromatic polyisocyanates, B) a polyol component containing B1) selected polycaprolactone polyols and/or selected polyether polyols, and optionally B2) other organic polyhydroxyl compounds, and C) known additives used in surface coating technology; and the application of such coating compositions for the manufacture of floor sealers or thin coatings.

6 Claims, No Drawings

TWO-COMPONENT POLYURETHANE COATING COMPOSITIONS AND THEIR USE FOR COATING OR SEALING FLOORS

BACKGROUND OF THE INVENTION

1. Field of the Invention

The invention relates to solvent-free or low-solvent two-component polyurethane coating compounds based on combinations of certain polyisocyanates and certain polyhydroxyl compounds and their use for the manufacture of floor sealers and floor coatings.

2. Description of the Prior Art

Floor sealers are coatings with a dry film thickness between 60 and 250 μm, which are applied to floors for the purpose of solidifying the substrate, providing an aesthetically pleasing finish and increasing the chemical resistance, wear resistance and scratch resistance. For example, floor sealers are used to solidify cement floors and render them scratch-resistant. If no particular requirements are set for crack-bridging capability, they are also used to provide cement floors, which are susceptible to yellowing, with an aesthetically more pleasing and more color-constant covering layer. Further, they are used to renovate old, heavily scratched and damaged floor coatings without having to provide a completely new coating.

A range of well-tried polyurethane systems are available to the custom molder for floor sealers. The sealers previously used were one-component systems based on NCO prepolymers of 4,4'-diisocyanato-diphenyl methane (cf. e.g. the Technical Memorandum of the Applicant "Desmodur E 21" of December 1990). However, these systems have a tendency to subsequently turn yellow, and generally must be mixed with volatile solvents for their application. Other known sealers include those based on NCO prepolymers of 1-isocyanato-3,3,5-trimethyl-5-isocyanato-methylcyclohexane (IPDI) and oxazolane resins as introduced by K.-H Hentschel and E. Jürgens at the XXI. FATIPEC-Congress (1992) in Amsterdam (cf. Congress Bulletin, Vol 3, pp 87 et seq.) and those based on combinations from urethanized toluene diisocyanate and polyester polyols (cf. e.g. Technical Memorandum of the Applicant "Desmodur L", 1.1.86 edition). However, these sealers also require substantial quantities of volatile solvents for their application.

In view of their excellent color consistency, combinations of polyisocyanates containing biuret or isocyanurate groups based on hexane 1,6-diisocyanate with polyester polyols are also widely used for providing a decorative finish to plastic floor coatings (cf. e.g. the paper given by W. Kubitza at the International Symposium on Industrial Floorings from 15.1 .to 17.1.91, Bulletin, pp. 533–537).

Such floor sealer s may be applied fully solvent-free and harden to form films which are very easily cleaned. However, only a moderate wear and scratch-resistance may be achieved, as such sealer. s are relatively soft. Sealers with substantially better hardness and wear resistance properties are based on combinations of the above-mentioned HDI-based polyisocyanates with hydroxy-functional polyacrylate or polymethacrylate resins. However, this advantage is offset by their high solvent content.

Therefore, an object of the present invention is to provide polyurethane-based coating compositions, which are suitable, in particular, for sealing floor surfaces, may be formulated to be solvent-free or low solvent-containing, fully harden rapidly under a wide range of ambient conditions and produce easy-to-clean sealing films with good chemical resistance and provide good color stability, a high degree of hardness and excellent scratch and wear resistance.

This object may be achieved with the two-component polyurethane coating compositions according to the invention, which will be described in further detail below. The coating compositions according to the invention may be processed solvent-free or with low solvent content. These systems have a content of solvents inert to isocyanate groups with a boiling point below 180° C. at normal pressure of less than 20, preferably less than 10 wt. %. In particular, the coating compositions according to the invention do not contain such readily volatile solvents.

SUMMARY OF THE INVENTION

The present invention relates to two-component polyurethane coating compositions which essentially contain A) a polyisocyanate component containing
- A1) 50 to 95 wt. % of one or more (cyclo)aliphatic polyisocyanates based on
  - A1.1) 50 to 100 wt. % of one or more polyisocyanates prepared from hexane 1,6-diisocyanate, containing isocyanurate and uretdione groups and having a viscosity at 23° C. of 100 to 300 mPa·s, a content of isocyanate groups of 20 to 24 wt. % and a content of urethane groups of 0 to 5 wt. % and
  - A1.2) 0 to 50 wt. % of one or more polyisocyanates having (cyclo)aliphatically bound isocyanate groups other than A 1.1) and
- A2) 5 to 50 wt. % of one or more aromatic polyisocyanates based on
  - A2.1) 50 to 100 NCO equivalent % of one or more urethane group-containing polyisocyanates prepared from toluene 2,4-, and optionally 2,6-diisocyanate and having an NCO content of 12 to 20 wt. % and a urethane group content (calculated as $CHNO_2$) of 12 to 29 wt. % and
  - A2.2) 0 to 50 NCO equivalent % of one or more polyisocyanates having aromatically bound isocyanate groups other than A2.1), B) a polyol component containing
- B1) 50 to 100 wt. % of one or more organic polyhydroxyl compounds having an average hydroxyl content of 6 to 23 wt. % and an average hydroxyl functionality of 2 to 4, selected from the group of (i) polycaprolactone polyols, (ii) polyether polyols wherein the alkylene oxide units are derived from 80 to 100 wt. % of propylene oxide units and 0 to 20 wt. % of ethylene oxide units, and (iii) mixtures (i) and (ii) and
- B2) 0 to 50 wt. % of one or more organic polyhydroxyl compounds other than B1 ) and C) optionally known additives from coating technology, wherein components A) and B) are present in quantities corresponding to an NCO/OH equivalent ratio of 0.9:1 to 1.3:1.

The present invention also relates to floor sealants or thin floor coatings prepared from these coating compositions.

DETAILED DESCRIPTION OF THE INVENTION

Polyisocyanate component A) is composed of a mixture of 50 to 95 wt. % of aliphatic polyisocyanates A1) and 5 to 50 wt. % of aromatic polyisocyanates A2). The aliphatic component A1) is based on 50 to 100, preferably 90 to 100 wt. % of low-viscosity derivatives of hexane 1,6-diisocyanate (HDI) meeting the requirements set forth above and 0 to 50, preferably 0 to 10 wt. % of other aliphatic polyisocyanates A 1.2).

Low-viscosity HDI polyisocyanates A1.1) containing isocyanurate and uretdione groups are manufactured, for example, by oligomerizing HDI in the presence of tributyl phosphine as oligomerization catalyst, terminating the oligomerization reaction when the desired degree of oligomerization has been reached by adding a suitable catalyst poison and removing by distillation the excess HDI that has not been converted. In the low-viscosity polyisocyanates A 1.1), the molar ratio of uretdione to isocyanurate groups is generally 1:1 to 4:1, and the viscosity at 23° C. is 100 to 300 mPa·s.

If desired, subequivalent quantities of alcohols, such as monohydric and polyhydric alcohols having a molecular weight in the range of 32 to 200, or mixtures thereof, may also be used in this reaction in order to incorporate urethane groups in a quantity of up to 5 wt. % into the oligomerization product. Suitable alcohols include methanol, ethanol, n-propanol, isopropanol, n-butanol, n-hexanol, 2-ethylhexanol-1, ethylene glycol, the isomeric butanediols, hexanediols, octanediols, diethylene glycol, dipropylene glycol, glycerol and trimethylol propane.

The aliphatic polyisocyanates A1.2), which are optionally present in component A 1 ), are preferably HDI-based polyisocyanates that do not contain uretdione groups. Preferred examples include polyisocyanates prepared from HDI which contain isocyanurate groups and have an NCO content of 20 to 23 wt. %, based on the weight of the solvent-free polyisocyanate, and polyisocyanates prepared from HDI which contain biuret groups and have an NCO content of 21 to 24 wt. %, based on the weight of the solvent-free polyisocyanate.

These polyisocyanates may be manufactured in accordance with EP-B-0010589 and EP-B-0003505. Polyisocyanate mixtures A1) composed of polyisocyanates A 1.1) comprising uretdione and isocyanurate groups with HDI derivatives A1.2) containing isocyanurate groups, but free of uretdione groups, may be prepared by mixing the individual components or in situ by suitably controlling the HDI oligomerization while forming uretdione and isocyanurate groups.

The aromatic polyisocyanate component A2) is based on 50 to 100 wt. %, preferably 90 to 100 wt. %, of derivatives of toluene 2,4-, and optionally 2,6-diisocyanate containing urethane groups and meeting the requirements set forth above, and to 0 to 50, preferably 0 to 10 wt. %, of other aromatic polyisocyanates A2.2).

Polyisocyanates A2.1) are derivatives of toluene 2,4-diisocyanate or of mixtures thereof with up to 35 wt. %, based on the weight of the mixture, of toluene 2,6-diisocyanate. Such polyisocyanates containing urethane groups are manufactured by reacting these diisocyanates with subequivalent quantities of polyhydric alcohols, such as trimethylol propane, the isomeric butanediols or mixtures thereof, and subsequently removing excess, unreacted diisocyanate by thin-film distillation. These polyisocyanates containing urethane groups may be manufactured in accordance with DE-PS 1,090,196 or U.S. Pat. No. 3,183,112.

The other aromatic polyisocyanates A2.2) include, in particular, polyisocyanates containing isocyanurate groups which are prepared from toluene 2,4- and/or 2,6-diisocyanate and have an NCO content of 14 to 18 wt. %, based on the weight of the solvent-free polyisocyanate. These polyisocyanates may be prepared in known manner in accordance with DE-PS 1,954,093, for example, with subsequent removal of the inert auxiliary solvent and the excess, unreacted diisocyanate by thin-film distillation. Also suitable as polyisocyanates A2.2) are copolymers containing isocyanurate groups which are prepared from mixtures of hexane 1,6-diisocyanate and toluene 2,4-, and optionally 2,6-isocyanate and have an NCO content of 15 to 20 wt. %, based on the weight of the solvent-free polyisocyanate, as described, for example, in DE-PS 1,670,667.

The common factor of all of the polyisocyanates present in the coating compositions according to the invention is that they contain a maximum of 0.5 wt. % of the starting diisocyanates used for their manufacture.

Polyol component B) is based on 50 to 100 wt. %, preferably 80 to 100 wt. % of polyols B1) which satisfy the requirements previously set forth, and 0 to 50, preferably 0 to 20 wt. % of other polyols B2).

Polyols B1) have an average OH content of 6 to 23, preferably 11 to 23 wt. %, and an OH functionality of 2 to 4, and are selected from the group of (i) polycaprolactone polyols, (ii) polyether polyols having alkylene oxide units derived from at least 80 wt. %, preferably 100 wt. %, of propylene oxide units and (iii) mixtures of (i) and (ii).

The polycaprolactone polyols are manufactured in known manner from ε-caprolactone and di- to tetra-functional polyols (such as ethylene glycol, propylene glycol, 1,4-butanediol, neopentyl glycol, glycerol, trimethylol propane, pentaerythritol and trimethylol propane) in the presence of suitable transesterification catalysts (e.g. tin compounds) at elevated temperature. The preparation of these polyols is described in further detail, for example, in the Encyclopedia of Polymer Science and Technology 5, 164 et seq., or in Kirk-Othmer (3rd edition), Vol. 5,640 et seq.

Suitable polyether polyols and their manufacture are described, for example, in the Encyclopedia of Polymer Science and Technology 6,273 et seq., in Kirk-Othmer (3rd edition), Vol. 18, 633 to 645 et seq., or in Ullmann (4th edition), Vol. 19, 31 to 38.

The polyol component B2), which may optionally be present, are selected from other polyols, i.e., polyhydroxyl compounds differing from polyols B1) and having a molecular weight of 62 to 2 000, preferably 62 to 1 000, and an OH functionality of 2 to 4. Examples include simple alkanediols having a molecular weight of 62 to 200, such as ethylene glycol, propylene glycol, 1,6-hexanediol, trimethylol propane and/or glycerol; polyether polyols, which do not meet the requirements of polyol B1) and have a molecular weight of 200 to 1000; and polyester polyols having a viscosity below 30 mPa·s (23° C.) and containing at least two hydroxyl groups per molecule. These polyesters may be produced in known manner known from monomeric alkane polyols previously described and polyfunctional polyhydric carboxylic acids, in particular dicarboxylic acids or dicarboxylic acid anhydrides, such as adipic acid, maleic acid, maleic anhydride, phthalic acid, isophthalic acid, tetrahydrophthalic acid, hexahydrophthalic acid and/or their anhydrides. Similarly, known carbonate polyols may be used as component B2) or as part of component B2). Castor oil may also be used.

Polyhydroxyl compounds B2) should have a maximum viscosity at 23° C. of 30,000, preferably 10,000 mPa·s.

By suitably selecting the type and quantity of polyhydroxyl compounds B2), the viscosity of the two-component binder mixture as well as the properties, in particular the hardness of the resulting coating, may be adjusted to the requirements of a particular application.

In the coating compositions according to the invention, components A) and B) are present in amounts sufficient to provide an NCO/OH equivalent ratio of 0.9:1 to 1.3:1.

The individual components are preferably selected such that the binder mixtures obtained by mixing individual components A) and B) have a viscosity at 23° C. of less than 50,000, preferably less than 30,000 and more preferably less than 10,000 mPa·s, and a potlife of 20 minutes to 10 hours, preferably 40 minutes to 4 hours. Besides the two-component binders, the coating compositions according to the invention may contain the known additives used in surface coating technology, such as fillers, pigments,pasdcizes, high-boiling liquids, curing catalysts, u.v. stabilizers:, antioxidants, microbiocides, algicides, dehydrators, thixotropic agents, wetting agents, flow modifiers, matting agents, anti-slip agents, de-aerators and extenders. The additives are chosen based on the requirements of the particular application and their compatibility with components A) and B). Hence, aqueous additives or those which are strongly alkaline, for example, should be mixed with component B) instead of component A).

Fillers suitable for two-component polyurethane coating compositions are known and are preferably particulate, spherical or platelike fillers which have a low moisture content and whose surfaces do not react too strongly alkaline. Typical representative examples of such fillers are barium sulphate, quartz powder, kaolin, silicas, ground or precipitated chalks (whose surfaces do not react too strongly alkaline) and mica. A detailed overview of paint materials is provided, for example, in the "Lehrbuch der Lacke und Beschichtungen, Band II,Pigmente, Füllstoffe, Farbstoffe" [Textbook of Varnishes and Coatings, Vol. I1., Pigments, Fillers, Dyes], H. Kittel, Verlag W.A. Colomb in der Heenemann GmbH, Berlin—Oberschwandorf, 1974, pp 284–463. The optional fillers may be used in quantities of up to 200 parts by weight per 100 parts by weight of the binder mixture of components A) and B).

Examples of suitable pigments are titanium dioxide, zinc oxide, iron oxides, chromium oxides and carbon black. A detailed overview of pigments for paint materials is provided in the "Lehrbuch der Lacke und Beschichtungen, Band I1., Pigmente, Füllstoffe, Farbstoffe", Kittel, Verlag W.A. Colomb in der Heenemann GmbH, Berlin—Oberschwandorf, 1974, pp 17–265. The optional pigments may be used in quantities of up to 45 wt. %, based on the weight of components A) and B).

In order to adjust the viscosity of the coating compositions, softeners or high-boiling liquids may be used. Liquids in this context should be understood to refer to those which have a boiling point under normal pressure of above 180° C. or which are incapable of being distilled at normal pressure. Examples include phthalic acid, adipic acid or phosphoric acid esters of $C_4$–$C_{18}$ alkanols and/or vinyl esters of alkaryl sulphonic acids. Alkylene carbonates, such as ethylene or propylene carbonate are examples of suitable high-boiling liquids that are especially well suited for adjusting viscosity. The optional softeners or high-boiling liquids may be used in quantities of up to 65 wt. %, based on the weight of components A) and B).

In certain cases, e.g., to obtain very low application viscosities or very thin dry films, known solvents having a boiling point below 180° C. under normal pressure, may also be used. Examples of these solvents include butyl acetate, 1-methoxy-propyl acetate, ethyl acetate, xylene and mixtures of such solvents in maximum quantities of 20 wt. %, preferably 10 wt. %, based on the weight of components A) and B). However, since it is an object of the present invention to avoid the presence of these solvents, their use is not preferred.

The coating compositions according to the invention may also contain the catalysts known from polyurethane chemistry. Examples include lead or bismuth compounds and preferably tin compounds and tertiary amines, such as those described in more detail in "Kunststoff Handbuch 7, Polyurethane" [Plastics Handbook 7, Polyurethanes], CarI-Hanser-Verlag, Munich—Vienna, 1984, pp 97–98. The optional catalysts may be used in quantities of up to 4 wt. %, based on the weight of components A) and B).

Further optional additives for the coating compositions according to the invention include u.v. stabilizers, antioxidants, microbiocides, algicides, dehydrators, thixotropic agents, wetting agents, flow enhancers, matting agents, anti-slip agents, de-aerators and extenders. These additives are described, for example, in the "Lehrbuch der Lacke und Beschichtungen, Band I! 1., Lösemittel, Weichmacher, Additive, Zwischenprodukte" [Textbook of Paints and Coatings, Vol. III Solvents, Softeners, Additives, Intermediate compounds], H. Kittel, Verlag W.A. Colomb in der Heenemann GmbH, Berlin—Oberschwandorf, 1976, pp 237–398. Drying agents (dehydrators) are described in more detail, for example, in "Kunststoff Handbuch 7, Polyurethane", CarI-Hanser-Verlag, Munich—Vienna, 1983, page 545. The total quantity of such optional additives generally amounts to 0 to 25 wt. %, based on the weight of components A) and B).

The coating compositions according to the invention may be prepared by mixing the individual components using the known dissolvers or vacuum dissolvers, which are often preferred, to substantially remove gas from the coating compositions.

The coating compositions according to the invention are particularly suitable for the manufacture of floor sealers. In this application, the coating compositions are applied in quantities sufficient to obtain dry film thicknesses of 30 to 600, preferably 60 to 400 μm. The coating compositions may be applied by known methods, such as trowelling or rolling.

The coating compositions according to the invention may also be used for sealing industrial or residential floors, preferably for indoor use. The base may be composed of old, scratched or worn floor coatings or plastic coverings. In this case, the floor surface is roughened by abrasive means to prepare it for sealing. The adhesion of two-component polyurethane sealants according to the invention on to substrates prepared in such a manner may optionally be improved by firstly applying a suitable intermediate primer. Other suitable substrates include inorganic materials such as cement floors, concrete, ceramic tiles etc. In this case, a composite coating is built up which finishes with a sealer based on the two-component polyurethane coating composition according to the invention. The composite coating includes either a first coat (primer) with a sealer top or a primer as the first coat, a ductile, crack-bridging intermediate layer (flexible membrane) and the sealant as the top layer.

Thin coatings are floor coatings with a slightly higher dry film thickness of 250 to 1000 μm. For example, they are used for floors in the food industry or food retail outlets, where good optical aspect characteristics, very good cleaning capability and a high mechanical durability (use by fork-lift trucks) are required. The built-up of such thin coatings is the same as for the sealers.

The following examples demonstrate the two-component polyurethane coating compositions or thin coatings according to the invention and their application in further detail. All parts and percentages are by weight unless otherwise indicated.

EXAMPLES

The following raw materials are used in the examples and comparative examples: Isocyanate components

Polyisocyanate I

An oligomerization product of hexane 1,6-diisocyanate (HDI) containing isocyanurate and uretdione groups and having a urethane group content of 2%, an isocyanate group content of 21.6% and a viscosity (23° C.) of 200 mPa·s.

Polvisocyanate II (component A according to the invention)

A mixture of 252 g of trimethylol propane and 120 g of diethylene glycol were slowly added dropwise at 80° C. to 3864 g of a TDI mixture containing 2511.6 g of toluene 2,4-diisocyanate (65%) and 1352.4 g of toluene 2,6-diisocyanate (35%). After subsequent stirring for two hours at 80° C., the product was separated from the monomer diisocyanate by vacuum thin-film distillation at 140° C. 0.13 hPa.

While still in the heated state, 3300 g of Polyisocyanate I previously heated to 80° C. were stirred into 1650 g of the thus obtained solvent-free polyisocyanate containing urethane groups (viscosity at 100° C. over 40 000 mPa·s, NCO content 17.3%, TDI monomer content 0.31%, urethane group content 28.2%), until the mixture became homogeneous.

The resulting Polyisocyanate Ii had a viscosity (23° C.) of 5000 mPa·s, an NCO content of 20.2%, a monomeric TDI content of 0.1% and a monomeric HDI content of 0.33%.

Polyisocyanate III

A biuret polyisocyanate based on HDI, dissolved to 75% in 1-methoxypropyl-acetate-2/xylene ( 1:1 ) and having a solution viscosity (23° C.) of 225 mPa·s and an NCO content of 16.5%, based on the weight of the solution.

Polyisocyanate IV

A biuret polyisocyanate based on HDI (100%) and having a viscosity (23° C.) of 2500 mPaos and an NCO content of 23%.

Polyisocyanate V

A polyisocyanate which contains urethane groups, is based on TDI corresponding to the aromatic component of polyisocyanate II, is dissolved to 67% in 1-methoxypropyl-acetate-2/xylene (1:1) and has a solution viscosity (230° C.) of 1500 mPa·s and an NCO content of 11.6%, based on the weight of the solution.

Polyisocyanate VI

An NCO prepolymer which contains urethane groups; is prepared by reacting (i) a polyisocyanate mixture of the diphenyl methane series having a diphenyl methane diisocyanate isomers content of 55% and a higher functional homologs content of 45%, with (ii) a polyether mixture containing 2000 pads by weight of a polypropylene glycol having an OH number of 56 and 3750 parts by weight of the propoxylation product of ethylene diamine having an OH number of 60; and has a viscosity (23° C.) of 10 000 mPa·s and an NCO content of 16.0%.

Polvisocyanate VII

An NCO prepolymer which is prepared by reacting (i) an isomeric mixture of 55% 2,4'- and 45% of 4,4'-diisocyanato diphenyl methane with (ii) a polyether mixture containing 750 pads by weight of a propoxylated ethylene diamine having an OH number of 60 and 400 pads by weight of polypropylene glycol having an OH number of 112; and has a viscosity (23° C.) of 1950 mPa·s and an NCO content of 15.5%.

Polyol Component 1

A trifunctional poly-s-caprolactone-polyol having a hydroxyl group content of 17%, a molecular weight of 300 and a viscosity (23° C.) of 2100 mPa·s.

Polyol Component II

A cross-linked polyester polyol which has a viscosity (23° C.), measured in a 70% solution in 1-methoxypropyl-acetate-2, of 750 mPa·s and an OH content of the 100% ester of 8.8% and is prepared by reacting 130 parts by weight of propylene glycol and 245 parts by weight of trimethylol propane with 305 pads by weight of adipic acid and 64 parts by weight of phthalic anhydride.

Polyol Component III

A linear polyester polyol having a viscosity (23° C.), measured in a 70% solution in 1-methoxypropyl-acetate-2, of 575 mPa·s and an OH content of the 100% ester of 1.2%.

Polyol Component IV

A polyacrylic resin containing hydroxyl groups and having a viscosity (23° C.) of 3000 mPa·s and an OH content of 1.6%.

In the following examples, with the exception of the solvents or catalysts used in Examples 3, 7 and 8, none of the known additives of surface coating technology were used. This does not mean that the sealers according to the invention should preferably be used without pigments, fillers and/or additives. To the contrary these ingredients were omitted so that advantages of the binder according to the present invention would be more apparent.

Example 1 (according to the invention)

To prepare a sealer according to the invention, 67 parts by weight of isocyanate component II were mixed with 32.2 parts by weight of polyol component I (viscosity of the mixture (23° C.) approx. 11000 mPa·s, NCO/OH equivalent ratio =1.06:1), and applied using a lambswool roller to a concrete surface, which had first been treated by applying a primer coat of a water-soluble epoxy primer. The properties of the hardened film are set forth in Table 2 and compared with those of the comparative examples.

Examples 2 to 8 (Comparative Examples)

The one- and two-component polyurethane sealers set forth in Table I were formulated, mixed and applied to—appropriately treated—concrete surfaces.

TABLE 1

Compositions for Comparison Examples 2 to 8 (data in wt. %)

| Components | 2 | 3 | 4 | 5 | 6 | 7 | 8 |
|---|---|---|---|---|---|---|---|
| Isocyanate component III | | | 19.4 | | | | |
| Isocyanate component IV | | | | | | | 49.0 |
| Isocyanate component I | | | | | | 99.7 | 50.5 |
| Isocyanate component V | 67.8 | 43.1 | | | | | |
| Isocyanate component VI | | | | 100 | | | |
| Isocyanate component VII | | | | | 100 | | |
| Polyol component A | 32.2 | | | | | | |
| Polyol component II | | 24.1 | | | | | |
| Polyol component III | | 24.1 | | | | | |
| Polyol component IV | | | 80.6 | | | | |
| 1-MPA* | | 8.7 | | | | | |
| DBTL* | | | | | | 0.3 | 0.5 |

*1-MPA = 1-methoxy-2-propyl acetate, DBTL = dibutyl tin dilaurate.

Important properties, such as abrasion resistance according to Taber (CS 10, 500 or 1000 revolutions, 1 kg lead), the solids content of the applied composition and the chemical resistance, were measured for Example 1 and Comparison Examples 2 to 8 and are set forth in Table 2.

The chemical resistance values were determined as follows: test films applied to glass plates at a dry film thickness of 100 μm were cured for 7 days at 50° C. After this time, the films were treated with the following solvents (duration of action approx. 5 minutes) and subjected to scratch tests: ethanol, 1-MPA, acetone, butyl acetate. Evaluation was made according to the following: 0= undamaged, 1= coating difficult to scratch, 2= coating difficult to scratch down to the substrate, 3= coating easily scratched down to the substrate, 4= coating was easily scratched down to the substrate and the film started to swell, 5=coating partly dissolved or markedly swollen. The individual values were added together for the overall evaluation (best total: 0, worst total: 20).

TABLE 2

Comparison of properties of Example 1 with Comparison Examples 2–8

| Example | Solid at application | Taber Wear Test (mg) (CS 10, 1 kg load) 500 revs. | 1000 revs. | Chemical Resistance total | ethanol | acetone |
|---|---|---|---|---|---|---|
| 1 | 100.0 | 7.0 | 14.5 | 4 | 0 | 2 |
| 2 | 77.6 | 17.7 | 36.0 | 0 | 0 | 0 |
| 3 | 77.1 | n.b.* | n.b.* | 0 | 0 | 0 |
| 4 | 62.9 | 36.3 | 76.7 | 8 | 2 | 3 |
| 5 | 100.0 | 4.5 | 10.5 | 1 | 0 | 0 |
| 6 | 100.0 | 3.0 | 9.0 | 4 | 0 | 3 |
| 7 | 100.0 | 10.3 | 21.0 | 0 | 0 | 0 |
| 8 | 100.0 | 6.0 | 12.3 | 0 | 0 | 0 |

*n.b. = non-determinable, films were soft and smudge during Taber wear test

Additional coating tests on concrete slabs with a relative humidity of 4% using the scalers: according to Examples 1, 5, 6 and 8 and varying the film thickness in a range of 50 to 300 μm revealed that the coating systems according to Comparison Examples 5, 6 and 8 had a strong tendency to form blisters even with film thicknesses less than 100 μm. This was a finding which was not observed in the system according to the invention.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A two-component polyurethane coating composition which consists essentially of
   A) a polyisocyanate component containing A1) 50 to 95 wt. % of one or more (cyclo)aliphatic polyisocyanates based on
      A1.1) 50 to 100 wt. % of one or more polyisocyanates prepared from hexane 1,6-diisocyanate, containing isocyanurate and uretdione groups and having a viscosity at 23° C. of 100 to 300 mPa·s, a content of isocyanate groups of 20 to 24 wt. % and a content of urethane groups of 0 to 5 wt. % and
      A1.2) 0 to 50 wt. % of one or more polyisocyanates having (cyclo)aliphatically bound isocyanate groups other than the polyisocyanates of A 1.1) and
   A2) 5 to 50 wt. % of one or more aromatic polyisocyanates based on
      A2.1) 50 to 100 NCO equivalent % of one or more urethane group-containing polyisocyanates prepared from toluene 2,4-, and optionally 2,6- diisocyanate and having an NCO content of 12 to 20 wt. % and a urethane group content (calculated as $CHNO_2$) of 12 to 29 wt. % and
      A2.2) 0 to 50 NCO equivalent % of one or more polyisocyanates having aromatically bound isocyanate groups other than the polyisocyanates of A2.1),
   B) a polyol component containing
      B1) 50 to 100 wt. % of one or more organic polyhydroxyl compounds having an average hydroxyl content of 6 to 23 wt. % and an average hydroxyl functionality of 2 to 4, selected from (i) polycaprolactone polyols, (ii) polyether polyols wherein the alkylene oxide units are derived from 80 to 100 wt. % of propylene oxide units and 0 to 20 wt. % of ethylene oxide units, or (iii) mixtures of (i) and (ii) and
      B2) 0 to 50 wt. % of one or more organic polyhydroxyl compounds other than B1) and
   C) optionally known additives from coating technology, wherein components A) and B) are present in quantities corresponding to an NCO/OH equivalent ratio of 0.9:1 to 1.3:1.

2. The coating composition of claim 1 wherein aliphatic polyisocyanate A1.2) is selected from (i) uretdione group-free polyisocyanates which contain isocyanurate groups, are prepared from hexane 1,6-diisocyanate and have an NCO content of 20 to 23 wt. % or (ii) polyisocyanates which contain biuret groups, are prepared from hexane 1,6-diisocyanate and have an NCO content of 21 to 24 wt. % or (iii) mixtures of (i) and (ii).

3. The coating composition of claim 1 wherein aromatic polyisocyanate A2.2) is selected from (i) polyisocyanates which contain isocyanurate groups, are prepared from toluene 2,4-, and optionally 2,6-diisocyanate and have an NCO content of 14 to 18 wt. % or (ii) polyisocyanates which contain isocyanurate groups, are prepared from hexane 1,6-diisocyanate and toluene 2,4-diisocyanate and optionally toluene 2,6-diisocyanate, and have an NCO content of 15 to 20 wt. %, or (iii) mixtures of (i) and (ii).

4. The coating composition of claim 2 wherein aromatic polyisocyanate A2.2) is selected from (i) polyisocyanates which contain isocyanurate groups, are prepared from toluene 2,4-, and optionally 2,6-diisocyanate and have an NCO content of 14 to 18 wt. % or (ii) polyisocyanates which contain isocyanurate groups, are prepared from hexane 1.6-diisocyanate and toluene 2,4-diisocyanate and optionally toluene 2,6diisocyanate, and have an NCO content of 15 to 20 wt. %, or (iii) mixtures of (i) and (ii).

5. The coating composition of claim 1 wherein polyol component B2) is selected from polyhydroxyl compounds having a molecular weight of 62 to 2 000 which optionally contain ether and/or ester groups.

6. A floor which is coated or sealed with the coating compositions of claim 1.

* * * * *